US012182283B1

(12) United States Patent
Dortch et al.

(10) Patent No.: US 12,182,283 B1
(45) Date of Patent: Dec. 31, 2024

(54) AUTHENTICATION SYSTEMS AND METHODS FOR INTERCONNECTED DEVICES

(71) Applicant: UIPCO, LLC, San Antonio, TX (US)

(72) Inventors: Celena Dortch, San Antonio, TX (US); Thomas Bret Buckingham, Fair Oaks Ranch, TX (US); Diego Contreras, Arlington, TX (US); William Daniel Farmer, Carrollton, TX (US); Eric LeRoy, Flower Mound, TX (US); Bharat Prasad, San Antonio, TX (US); Thomas Wayne Schwarz, Jr., Helotes, TX (US); Qian Zhao, Dallas, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 343 days.

(21) Appl. No.: 17/401,991

(22) Filed: Aug. 13, 2021

Related U.S. Application Data

(60) Provisional application No. 63/065,943, filed on Aug. 14, 2020.

(51) Int. Cl.
G06F 21/34 (2013.01)
G06F 21/31 (2013.01)
G06F 21/62 (2013.01)
G06Q 40/02 (2023.01)
G16Y 30/10 (2020.01)
G05B 15/02 (2006.01)
G06Q 20/30 (2012.01)

(52) U.S. Cl.
CPC ........ G06F 21/6209 (2013.01); G06F 21/316 (2013.01); G06F 21/34 (2013.01); G06Q 40/02 (2013.01); G16Y 30/10 (2020.01); G05B 15/02 (2013.01); G06Q 20/308 (2020.05)

(58) Field of Classification Search
CPC .............................. G06F 21/316; G06F 21/34
See application file for complete search history.

(56) References Cited

U.S. PATENT DOCUMENTS

| 6,154,879 | A  | 11/2000 | Pare, Jr. et al.   |
| 6,233,565 | B1 | 5/2001  | Lewis et al.       |
| 6,618,806 | B1 | 9/2003  | Brown et al.       |
| 6,697,806 | B1 | 2/2004  | Cook               |
| 6,898,633 | B1 | 5/2005  | Lyndersay et al.   |
| 6,920,559 | B1 | 7/2005  | Nessett et al.     |
| 7,480,939 | B1 | 1/2009  | Nessett et al.     |
| 7,765,580 | B2 | 7/2010  | Vandergeest et al. |

(Continued)

FOREIGN PATENT DOCUMENTS

| AU | 2016101183 A4 | 9/2016 |
| CN | 105681301 A   | 6/2016 |

(Continued)

Primary Examiner — David J Pearson
(74) Attorney, Agent, or Firm — Fletcher Yoder, P.C.

(57) ABSTRACT

An authentication system includes processing circuitry that is configured to receive an indication of a number of interconnected devices that are in communication with a user device, compare the number of interconnected devices that are in communication with the user device to a threshold, and grant access to an application on the user device in response to the number of interconnected devices meeting or exceeding the threshold.

20 Claims, 4 Drawing Sheets

(56) References Cited

U.S. PATENT DOCUMENTS

| | | |
|---|---|---|
| 8,051,142 B2 | 11/2011 | Pizano |
| 8,250,632 B1 | 8/2012 | Staddon |
| 8,291,236 B2 | 10/2012 | Vantalon et al. |
| 8,365,258 B2 | 1/2013 | Dispensa |
| 8,510,820 B2 | 8/2013 | Oberheide et al. |
| 8,533,796 B1 | 9/2013 | Shenoy et al. |
| 8,752,150 B2 | 6/2014 | Ivanov et al. |
| 8,793,490 B1 | 7/2014 | Szwalbenest |
| 8,918,479 B2 | 12/2014 | O'Connell et al. |
| 9,003,504 B2 | 4/2015 | Goldberg |
| 9,009,778 B2 | 4/2015 | Pearce et al. |
| 9,042,608 B2 | 5/2015 | Black |
| 9,043,887 B2 | 5/2015 | McLachlan et al. |
| 9,147,061 B1 | 9/2015 | McClendon et al. |
| 9,195,834 B1 | 11/2015 | Jakobsson |
| 9,225,716 B2 | 12/2015 | Tuchman et al. |
| 9,240,887 B2 | 1/2016 | Hamlin et al. |
| 9,275,208 B2 | 3/2016 | Protopapas |
| 9,317,673 B2 | 4/2016 | Grigg et al. |
| 9,569,771 B2 | 2/2017 | Lesavich et al. |
| 9,686,272 B2 | 6/2017 | Blinn |
| 9,722,790 B2 | 8/2017 | Ebrahimi |
| 9,774,578 B1 | 9/2017 | Ateniese et al. |
| 9,817,958 B1* | 11/2017 | McCorkendale ....... H04L 63/20 |
| 10,063,542 B1 | 8/2018 | Kao |
| 10,164,973 B1 | 12/2018 | Prasad et al. |
| 10,263,981 B1 | 4/2019 | Prasad et al. |
| 10,601,819 B1 | 3/2020 | Prasad et al. |
| 10,616,216 B1 | 4/2020 | Prasad et al. |
| 11,032,286 B1 | 6/2021 | Prasad et al. |
| 2009/0119754 A1 | 5/2009 | Schubert |
| 2009/0210328 A1 | 8/2009 | Fomenko et al. |
| 2009/0254975 A1* | 10/2009 | Turnbull ............... H04W 4/029 |
| | | 709/205 |
| 2010/0257357 A1 | 10/2010 | McClain |
| 2014/0047531 A1* | 2/2014 | Zaitsev .................. G06F 21/62 |
| | | 726/9 |
| 2014/0214670 A1 | 7/2014 | McKenna |
| 2015/0229650 A1* | 8/2015 | Grigg .................. G06F 21/316 |
| | | 726/7 |
| 2015/0278820 A1 | 10/2015 | Meadows |
| 2015/0332395 A1 | 11/2015 | Walker et al. |
| 2015/0356524 A1 | 12/2015 | Pennanen |
| 2015/0356555 A1 | 12/2015 | Pennanen |
| 2015/0365405 A1 | 12/2015 | Kalinichenko et al. |
| 2015/0371224 A1 | 12/2015 | Lingappa |
| 2015/0379510 A1 | 12/2015 | Smith |
| 2016/0034675 A1* | 2/2016 | Chandra ................. G06F 21/31 |
| | | 726/7 |
| 2016/0203477 A1 | 7/2016 | Yang et al. |
| 2016/0212129 A1* | 7/2016 | Johnston ................. G06F 21/73 |
| 2016/0261411 A1 | 9/2016 | Yau et al. |
| 2016/0321751 A1 | 11/2016 | Creighton, IV et al. |
| 2016/0330027 A1 | 11/2016 | Ebrahimi |
| 2016/0358165 A1 | 12/2016 | Maxwell |
| 2016/0365978 A1 | 12/2016 | Ganesan et al. |
| 2017/0048216 A1 | 2/2017 | Chow et al. |
| 2017/0053249 A1 | 2/2017 | Tunnell et al. |
| 2017/0076280 A1 | 3/2017 | Castinado et al. |
| 2017/0076286 A1 | 3/2017 | Castinado et al. |
| 2017/0078299 A1 | 3/2017 | Castinado et al. |
| 2017/0103391 A1 | 4/2017 | Wilson, Jr. et al. |
| 2017/0105171 A1* | 4/2017 | Srivastava .............. H04L 67/63 |
| 2017/0109748 A1 | 4/2017 | Kote |
| 2017/0140375 A1 | 5/2017 | Kunstel |
| 2017/0177898 A1 | 6/2017 | Dillenberger |
| 2017/0206382 A1 | 7/2017 | Rodriguez De Castro et al. |
| 2017/0228704 A1 | 8/2017 | Zhou et al. |
| 2017/0230375 A1 | 8/2017 | Kurian |
| 2017/0232300 A1 | 8/2017 | Tran et al. |
| 2017/0244707 A1 | 8/2017 | Johnsrud et al. |
| 2017/0250972 A1 | 8/2017 | Ronda et al. |
| 2017/0278186 A1 | 9/2017 | Creighton, IV et al. |
| 2017/0279801 A1 | 9/2017 | Andrade |
| 2017/0287068 A1 | 10/2017 | Nugent |
| 2017/0289111 A1 | 10/2017 | Voell et al. |
| 2018/0077569 A1* | 3/2018 | Chao ..................... H04L 67/104 |
| 2018/0288209 A1* | 10/2018 | Kim .................... H04L 63/0853 |
| 2018/0374097 A1 | 12/2018 | Hanna |
| 2019/0043054 A1* | 2/2019 | Crank ................... H04W 12/08 |
| 2019/0052630 A1* | 2/2019 | Lapidous ............ H04L 63/0853 |
| 2019/0190992 A1* | 6/2019 | Warrick ................ H04L 67/125 |
| 2019/0349385 A1* | 11/2019 | Fox ........................ H04L 63/20 |
| 2020/0022322 A1* | 1/2020 | Lafian ................... H04L 9/3226 |
| 2020/0053091 A1* | 2/2020 | Childress ............. H04L 63/108 |

FOREIGN PATENT DOCUMENTS

| | | |
|---|---|---|
| CN | 106230808 A | 12/2016 |
| CN | 106230852 A | 12/2016 |
| CN | 106408299 A | 2/2017 |
| CN | 106484836 A | 3/2017 |
| CN | 106504091 A | 3/2017 |
| KR | 101590076 B1 | 2/2016 |
| KR | 101591244 B1 | 2/2016 |
| KR | 20160150278 A | 12/2016 |
| KR | 101762245 B1 | 7/2017 |
| KR | 101773073 B1 | 8/2017 |
| KR | 101773074 B1 | 8/2017 |
| KR | 101780636 B1 | 9/2017 |
| WO | 2016036969 A1 | 3/2016 |
| WO | 2017006134 A1 | 1/2017 |
| WO | 2017006135 A1 | 1/2017 |
| WO | 2017006136 A1 | 1/2017 |
| WO | 2017021154 A1 | 2/2017 |
| WO | 2017044554 A1 | 3/2017 |
| WO | 2017066715 A1 | 4/2017 |
| WO | 2017079795 A1 | 5/2017 |
| WO | 2017091530 A1 | 6/2017 |
| WO | 2017104899 A1 | 6/2017 |
| WO | 2017119564 A1 | 7/2017 |
| WO | 2017136956 A1 | 8/2017 |
| WO | 2017139688 A1 | 8/2017 |
| WO | 2017146333 A1 | 8/2017 |

* cited by examiner

AUTHENTICATION SYSTEMS AND METHODS FOR INTERCONNECTED DEVICES

CROSS-REFERENCE TO RELATED APPLICATION

This application claims priority to and the benefit of U.S. Provisional Application No. 63/065,943, entitled "AUTHENTICATION SYSTEMS AND METHODS FOR INTERCONNECTED DEVICES," filed Aug. 14, 2020, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Authentication systems and methods may be utilized to confirm or to verify an identity of a user. For example, a user of a computing device may attempt to log into a back-end system, and authentication systems and methods may be utilized to ensure that the user is authorized to log into the back-end system. In some cases, authentication can be achieved based on credentials input by the user (e.g., username and password).

Interconnected devices, which are sometimes referred to as Internet of Things (IoT) devices, are devices that include components (e.g., processor, sensor, and/or communication device) that enable the devices to exchange data over a network. For example, a user may have multiple interconnected devices, such as thermostats, alarm systems, televisions, and the like, in their home. It is presently recognized that it may be desirable to provide authentication systems and methods for the interconnected devices.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, an authentication system includes processing circuitry configured to receive an indication of a number of interconnected devices that are in communication with a user device. The processing circuitry is also configured to compare the number of interconnected devices that are in communication with the user device to a threshold. The processing circuitry is further configured to grant access to an application on the user device in response to the number of interconnected devices meeting or exceeding the threshold.

In an embodiment, an authentication system includes processing circuitry configured to receive a request to authenticate a user via an authentication application installed on a user device. The processing circuitry is also configured to perform a first authentication step that includes obtaining and verifying a passcode, a password, or biometric data. The processing circuitry is further configured to confirm that a support application that is configured to enable the user to control a plurality of interconnected devices is installed on the user device. The processing circuitry is further configured to, in response to completion of the first authentication step and confirmation that the support application is installed on the user device, provide a credential that indicates authentication of the user to the support application.

In an embodiment, a method of operating an authentication system includes receiving, at processing circuitry, an indication of a number of interconnected devices that are in communication with a user device. The method also includes comparing, with the processing circuitry, the number of interconnected devices that are in communication with the user device to a threshold. The method further includes granting, with the processing circuitry, access to an application on the user device in response to the number of interconnected devices meeting or exceeding the threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
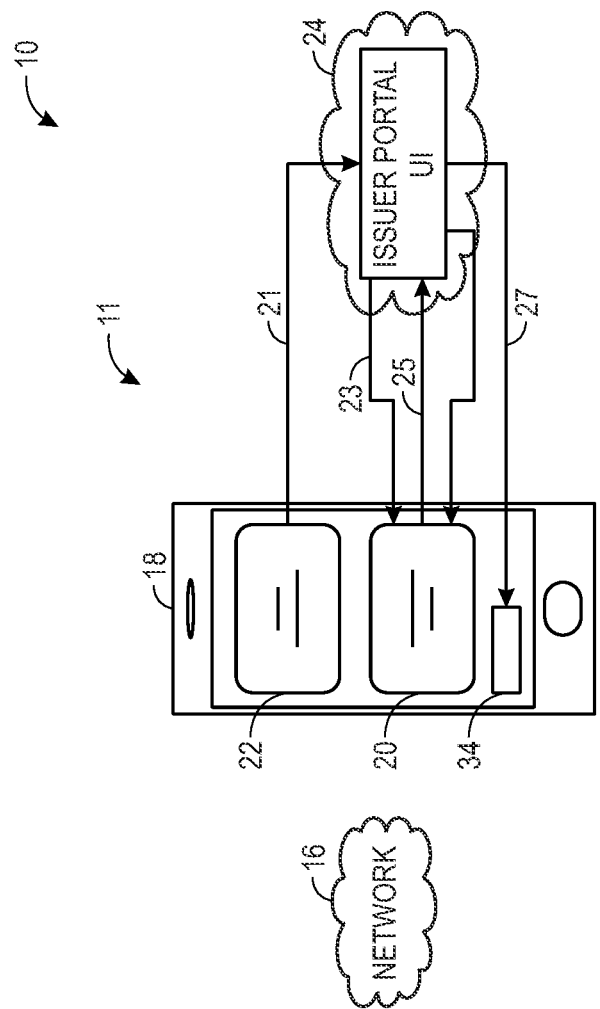
FIG. 1 is a schematic representation of an authentication system for interconnected devices, in accordance with an embodiment of the present disclosure.
Figure 1:
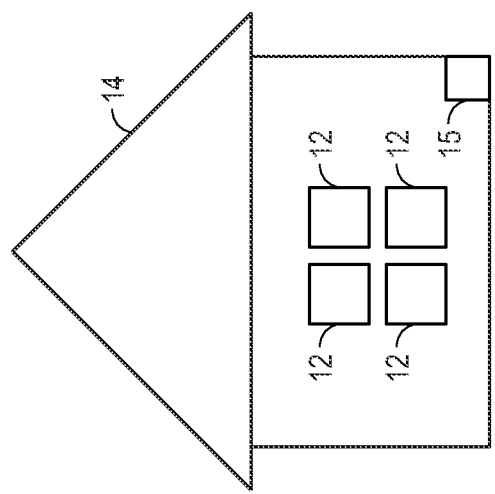

Embodiments of the present disclosure are directed to authentication systems and methods for interconnected devices (e.g., IoT devices). With the foregoing in mind, FIG. 1 is a schematic representation of an embodiment of a system 10 (e.g., a smart home system) that includes an authentication system 11 and interconnected devices 12. In the illustrated embodiment, at least some of the interconnected devices 12 are within a structure 14 (e.g., home), and thus, the interconnected devices 12 may include thermostats, washing machines, dryers, refrigerators, alarm systems, light controls, televisions, and/or other home appliances or devices. It should be appreciated that the system 10 may include interconnected devices 12 at other locations, such as outside of the structure 14 and/or within other buildings. Regardless of the type and/or location of the interconnected devices 12, the interconnected devices 12 are configured to communicate (e.g., provide data; receive control signals) with one another and/or with other connected devices, such as a user device 18. The interconnected devices 12 may be configured to communicate using any of a variety of wired or wireless protocols (e.g., Wi-Fi, ZigBee, Z-Wave, Bluetooth, MiWi, Ethernet). The user device 18 may be a smart phone, a tablet, a laptop, a watch, or any other suitable electronic computing device.

The system 10 may include one or more connections (e.g., network interfaces; routers) that are configured to connect to a network 16 (e.g., the Internet). In some embodiments, the system 10 may include a hub 15 that is communicatively coupled to the network 16 and that is also communicatively coupled to the interconnected devices 12 via any of the variety of wired or wireless protocols. Thus, the hub 15 and/or the interconnected devices 12 may be controlled via an application running on the user device 18. For example, a support entity (e.g., business organization) may provide a support application 20 that enables control of the interconnected devices 12, even if the interconnected devices 12 are manufactured by different manufacturing entities (e.g., vendors; business organizations).

It is presently recognized that it would be desirable to authenticate the user prior to allowing the user to communicate with and control the interconnected devices 12 using the support application 20 on the user device 18. In some embodiments, the authentication protocol may be carried out via another application running on the user device 18. For example, an authentication entity (e.g., issuer; business organization) may provide an authentication application 22 that facilitates the authentication protocol. The authentication protocol may include biometrics, passcodes, passwords, and/or other authentication types. In some embodiments, the authentication protocol is a multifactor authentication protocol. As shown, an authentication computing system 24 (e.g., cloud computing system) associated with the authentication entity may communicate with the user device 18 during the authentication protocol.

As an example, in operation, the user may open the authentication application 22 on the user device 18. The authentication application 22 may prompt the user to input a passcode, a password, biometric data, or the like to complete a first authentication step (e.g., local authentication step). The authentication computing system 24 may determine or receive an indication that the first authentication step is complete. Next, the authentication computing system 24 may determine whether the support application 20 is installed on the user device 18. For example, the authentication computing system 24 may attempt to communicate with the support application 20 and/or may access this information from the user device 18. Then, upon successful completion of the first authentication step and upon confirmation that the support application 20 is installed on the user device 18, the authentication computing system 24 may provide a credential to the support application 20 (e.g., to open the support application and/or to enable use of the support application 20 to control the interconnected devices 12). In this way, the support application 20 may enable use of the support application 20 to control the interconnected devices 12 only after the user has been authenticated via the authentication application 22 and the authentication computing system 24.

It should be appreciated that other variations are envisioned. For example, the support application 20 may be available and operable to control one or more of the interconnected devices 12 (e.g., a first set; interior light controls, exterior light controls, and/or other devices) without the credential and one or more of the interconnected devices 12 (e.g., a second set; an alarm system, a thermostat, and/or other devices) only with the credential. In this way, the support application 20 may enable use of the support application 20 to control at least some of the interconnected devices 12 only after the user has been authenticated via the authentication application 22 and the authentication computing system 24.

In some embodiments, the support application 20 may be not be available (e.g., able to be opened) without the credential from the authentication computing system 24. Additionally or alternatively, the support application 20 may be automatically opened (e.g., activated) in response to receipt of the credential from the authentication computing system 24. Additionally or alternatively, certain features within the support application 20 (e.g., virtual buttons to control some of all of the interconnected devices 12) may be automatically displayed and/or enabled in response to receipt of the credential from the authentication computing system 24. For example, a virtual button to control at least one of the interconnected devices 12 (e.g., an appliance) within the structure 14 may not be visible or may have an inactive appearance (e.g., be grayed out and/or presented in dashed lines) while the support application 20 is open and prior to receipt of the credential. Then, the virtual button may be displayed to be visible or may have an active appearance (e.g., in color and/or in solid lines) while the support application 20 is open and after receipt of the credential. In this way, the grant of access to the support application 20 may include granting access to the support application 20 or certain features thereof.

As shown in FIG. 1, the authentication computing system 24 may also interact with the support application 20 to determine that the support application 20 is installed on the user device 18 and/or is ready to receive the credential (e.g., by making an offer for the credential and receiving a consent for the credential), and then the authentication computing system 24 may send the credential to the support application 20. The credential may enable the support application 20 to be used to control the interconnected devices 12 (e.g., that the support application 20 would otherwise be unable to control without the credential) for a period of time, such as 1, 2, 3, 4, 24, or more hours, and/or for a number of sessions (e.g., logins/access to the support application 20), such as for 1, 2, 3, 4, or more sessions, after receipt of the credential at the support application 20. After expiration of the credential, the user may utilize the user device 18 to complete the authentication step(s) again in order to obtain another credential and to enable use of the support application 20 to control at least some of the interconnected devices 12.

In some embodiments, the authentication application 22 may prompt the user to complete a second authentication step (e.g., non-local authentication step) prior to providing the credential to the support application 20. For example, the authentication computing system 24 may send an authentication code (e.g., passcode, password) to a registered email address of the user, a registered phone number of the user, and/or to another registered device of the user. Then, the user may locate the authentication code and may interact with the authentication code (e.g., by clicking on a link with the authentication code; by entering the authentication code into the authentication application 22). In this way, the authentication computing system 24 may determine and confirm that an individual who is attempting to use the user device 18 and the support application 20 installed thereon to control the interconnected devices 12 is associated with the registered email address, the registered phone number, and/or another registered device. Together, the first authentication step and the second authentication step may indicate that the user is handling the user device 18 and that it is appropriate for the credential to be sent from the authentication computing system 24 to the support application 20 so that the support application 20 may then be used to control the interconnected devices 12.

In FIG. 1, a communication (e.g., with authentication information input by the user) from the authentication application 22 to the authentication computing system 24 is represented by arrow 21, a communication (e.g., with an offer to send the credential; to confirm the presence of the support application 20) from the authentication computing system 24 to the support application 20 is represented by arrow 23, a communication (e.g., with consent to receive the credential; that confirms the presence of the support application 20) from the support application 20 to the authentication computing system 24 is represented by arrow 25, and a communication (e.g., with the credential) from the authentication computing system 24 to the support application 20 is represented by arrow 27.

Figure 2:
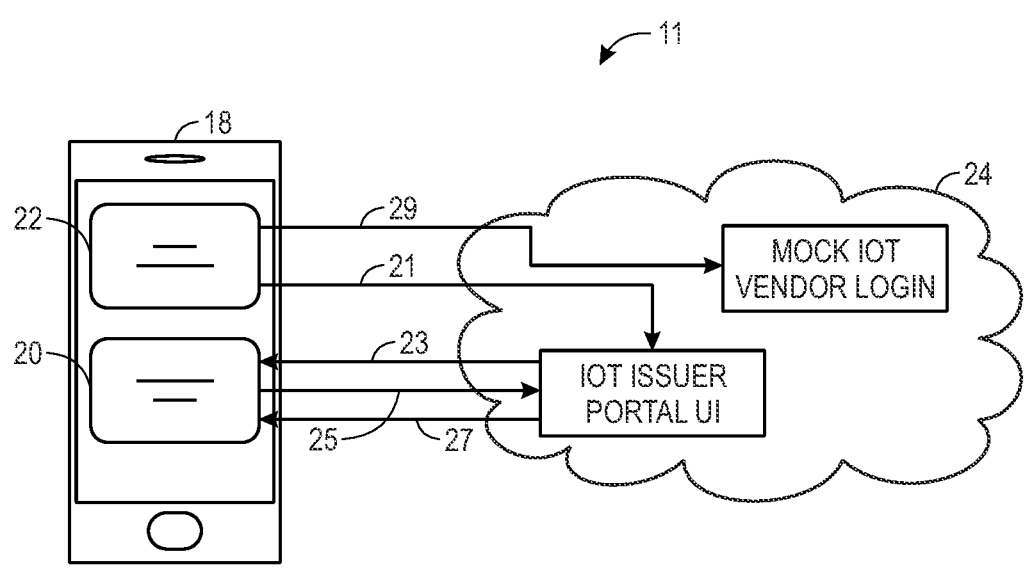
FIG. 2 is a schematic representation of an authentication system for interconnected devices, in accordance with an embodiment of the present disclosure.

FIG. 2 is a schematic representation of an embodiment of the authentication system 11 for the interconnected devices 12. As shown, the user device 18 has the support application 20 and the authentication application 22 installed thereon. In the illustrated embodiment, the authentication application 22 may facilitate the authentication protocol by requesting that the user provide login information to access the interconnected devices. This may be a mock login process that simulates a login process for the vendor of the interconnected devices 12. Upon entry of the login information, the authentication computing system 24 may enable any of the steps described above with respect to FIG. 1 to authenticate the user and to provide the user access to control the interconnected devices via the support application 20. For example, the authentication computing system 24 may consider the entry of the login information to be the first authentication step (or may prompt the user to complete the first authentication step that is separate from the login information) and/or may prompt the user to complete the second authentication step. Then, the authentication computing system 24 may output the credential to the support application 20 so that the support application 20 may then be used to control the interconnected devices 12.

In FIG. 2, a communication (e.g., with the login information for the mock login process) from the authentication application 22 to the authentication computing system 24 is represented by arrow 29, the communication (e.g., with other authentication information input by the user; to navigate to an issuer portal) from the authentication application 22 to the authentication computing system 24 is represented by arrow 21, the communication (e.g., with an offer to send the credential; to confirm the presence of the support application 20) from the authentication computing system 24 to the support application 20 is represented by arrow 23, the communication (e.g., with consent to receive the credential; that confirms the presence of the support application 20) from the support application 20 to the authentication computing system 24 is represented by arrow 25, and the communication (e.g., with the credential) from the authentication computing system 24 to the support application 20 is represented by arrow 27.

Figure 3:
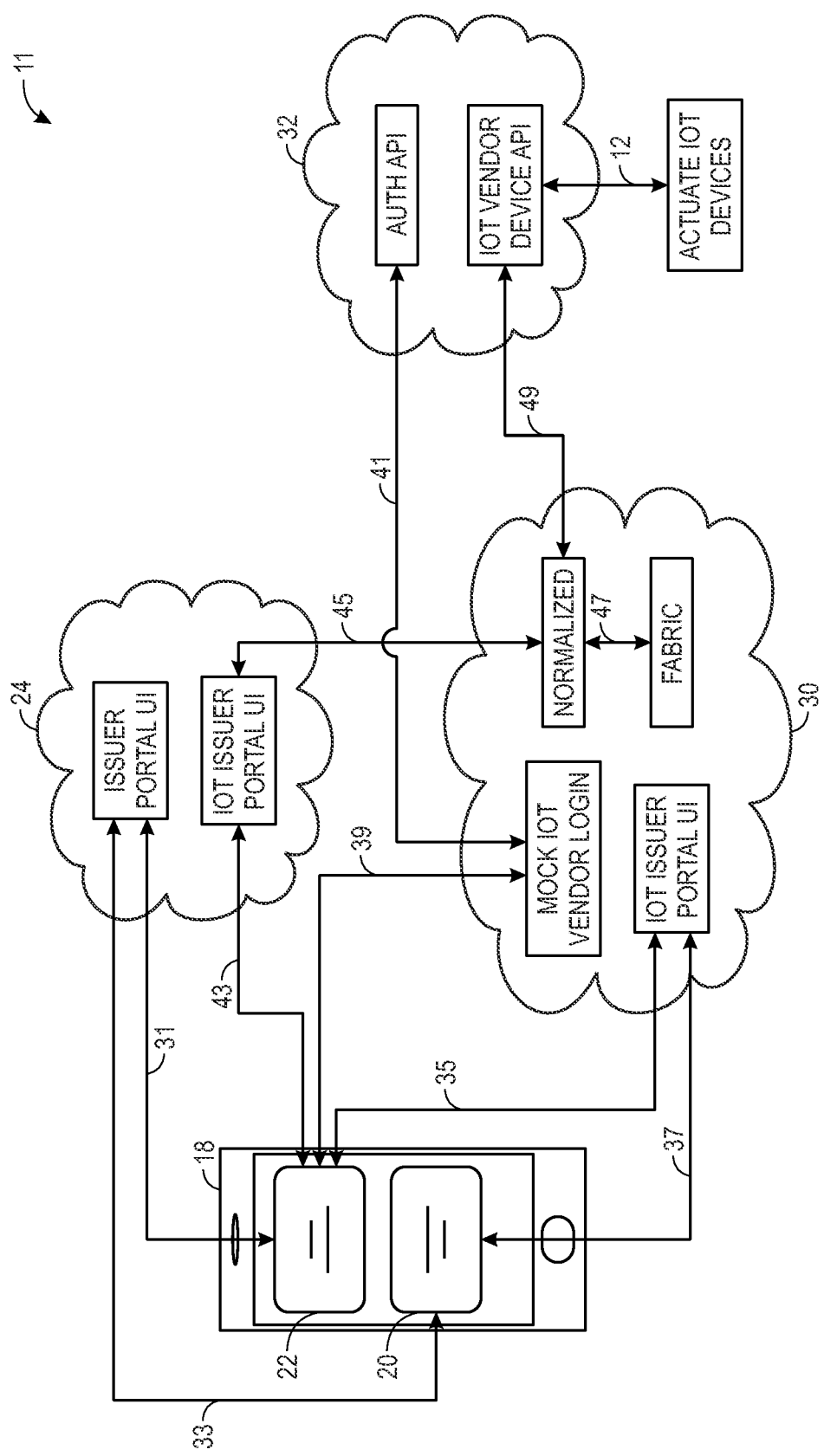
FIG. 3 is a schematic representation of an authentication system for interconnected devices, in accordance with an embodiment of the present disclosure.

FIG. 3 is a schematic representation of an embodiment of the authentication system 11 for the interconnected devices 12. As shown, the user device 18 has the support application 20 and the authentication application 22 installed thereon. In the illustrated embodiment, the user may carry out an authentication protocol via the authentication application 22 and the authentication computing system 24 (e.g., in the manner discussed above with respect to FIG. 1 or FIG. 2). For example, as represented by arrow 31, the user may open the authentication application 22 on the user device 18, and the authentication application 22 may prompt the user to complete the first authentication step and/or the second authentication step. Then, as represented by arrow 33, the authentication computing system 24 may provide the credential to the support application.

In FIG. 3, a support computing system 30 may be communicatively coupled to the user device 18, the authentication computing system 24, and/or a vendor computing system 32. The support computing system 30 may carry out a respective authentication protocol, such as by assessing the password or other information input by the user into the authentication application 22, as represented by arrow 35, and then providing a respective credential to the support application 20, as represented by arrow 37. The authentication application 22 may also facilitate a mock login process that simulates a login process for the vendor of the interconnected devices 12. As shown, upon entry of the login information at the authentication application 22, as represented by arrow 39, the support computing system 30 may connect to and provide the login information to the vendor computing system 32, as represented by arrow 41. This may authorize the support computing system 30 to use a vendor application programming interface (API) to control the interactive devices 12.

In some embodiments, the user may be able to use the authentication application 22 to provide a control input to adjust the interconnected devices 12, as represented by arrow 43. The control input may be provided to the support computing system 30, as represented by arrow 45. The control input may be recorded and stored in a library (e.g., fabric) associated with the support computing system 30, as represented by arrow 47. The support computing system 30 may then provide an indication of the control input to vendor API, as represented by arrow 49. Then, the vendor API may provide actuation signals to actuate the interconnected devices 12, as represented by arrow 51. In this way, the support application 20, the authentication application 22, the authentication computing system 24, and the support computing system 30 may authenticate the user and then interact with the vendor computing system 32 to provide the user with the ability to control the interconnected devices 12 via control inputs at the authentication application 22. It should also be appreciated that the components and techniques described with reference to FIG. 3 may be adapted to enable the user to control the interconnected devices 12 via control inputs at the support application 20. Indeed, it should be appreciated that any of the steps of the authentication protocol and the control process for the interconnected devices 12 may be carried out via inputs to any application(s) of the user device 18 and by processing at the authentication computing system 24, the support computing system 30, and/or the vendor computing system 32 (e.g., by processing circuitry of these systems 24, 30, 32).

Figure 4:
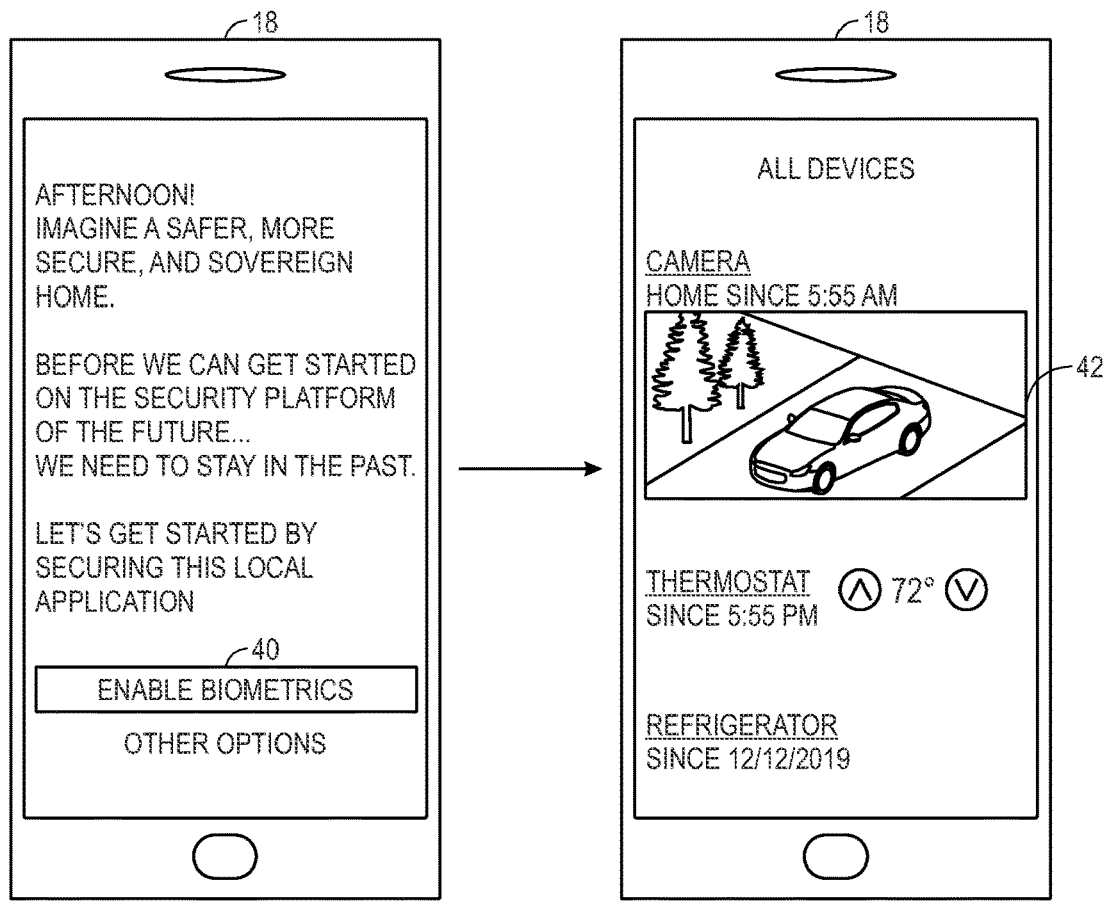
FIG. 4 is a schematic representation of information that may be presented on a graphical user interface by an authentication system, in accordance with an embodiment of the present disclosure.

FIG. 4 is an embodiment of a series of graphical user interfaces (GUIs) that may be presented to the user on the user device 18 as part of the authentication protocol and to enable the user to use the user device 18 to control the interconnected devices 12. Upon opening the authentication application 22, the user may be prompted (e.g., with a virtual button 40) to enable biometrics or the user may select other options (e.g., passcode, password) to complete the first authentication step. Upon completion of the first authentication step, confirmation that the support application is installed on the user device, and/or completion of the second authentication step, the user may then be granted access to control the interconnected devices (e.g., via the authentication application 22; via the support application 20 after transfer of the credential). For example, as shown, the user may be able to control and/or view images (e.g., video images 42) from a camera, control and/or view data from a thermostat, and the like with the user device 18. As noted herein, the virtual buttons and/or the images may be made visible and/or active on the user device 18 in response to completion of the authentication protocol.

With reference to FIG. 1 to facilitate discussion, it is also presently recognized that it may be desirable to utilize information about the interconnected devices 12 that are in proximity to and/or that are communicatively connected to the user device 18 for authentication purposes (e.g., as a first or a second authentication step). In some embodiments, the user may establish a profile (e.g., system profile) for the system 10. For example, the user may provide inputs that indicate that the system 10 includes certain interconnected devices 12, such as a first interconnected device (e.g., a thermostat), a second interconnected device (e.g., a smart doorbell), a third interconnected device (e.g., outdoor camera), and/or a fourth interconnected device (e.g., a vehicle), and so on.

The user may also provide inputs that set a respective priority (e.g., relative priority or rank; numerical value) for each interconnected device 12 in the system 10. The priority may be based on a reliability (e.g., expected reliability; a likelihood of the interconnected device 12 being communicatively connected to the user device 18) while the user is within the structure 14 and/or while the user attempts to use the user device 18 to control the interconnected devices 12. For example, the first interconnected device and/or the second interconnected device may be permanent fixtures within the structure 14, and the first interconnected device may have a wired connection (e.g., to the network interface and/or the hub 15), while the second interconnected device may have a wireless connection (e.g., to the network interface and/or the hub 15). However, the third interconnected device may be outside of the structure 14, which may make its communications less reliable as compared to interconnected devices within the structure 14, for example. Furthermore, the fourth interconnected device may be movable with respect to the structure 14, and may not be present at or near the structure 14 at certain times. Accordingly, the user may set a first highest priority for the first interconnected device, a second high-intermediate priority for the second interconnected device, and a third low-intermediate priority for the third interconnected device, and a lowest intermediate priority for the fourth interconnected device. The various interconnected devices 12 may additionally or alternatively be prioritized based on security (e.g., a likelihood of being hacked) and/or other factors. Furthermore, the user may elect to adjust the priority based on experience, such as to lower the priority for one of the interconnected devices that has historically been less reliable. The user may set and/or adjust the priority manually via inputs, such as via inputs to the support application 20 and/or the authentication application 22, during a setup process.

In some embodiments, the user device 18 (an app or program stored thereon and activated by a processor; the authentication application 22) may utilize an algorithm, a lookup table, artificial intelligence, or the like to assess and prioritize the various interconnected devices 12 for authentication purposes. This automated generation of a hierarchy of the interconnected devices 12 for authentication purposes may take into account the reliability (e.g., whether consistently operating, operating based on battery and direct power, proximity to the hub 15 and/or the structure 14) and/or security (e.g., whether a device has sufficient local protocols to avoid hacking). It should be noted that this hierarchy of interconnected devices 12 for authentication purposes makes computer operation more efficient and secure. For example, the user may have numerous interconnected devices 12 assembled in the hierarchy for authentication purposes, but some may not be operational when authentication is completed. Thus, those can be skipped over and others used, which avoids delays in authentication and increases the speed of operation for a related network or computer system.

Further, because the hierarchy may be organized based on reliability and/or security, when preferred interconnected devices 12 are not available to authenticate, more of the less preferred interconnected devices 12 may be required for authentication. For example, if only three preferred interconnected devices 12 need to be detected as local to the user device 18 that will be used to control the interconnected devices 12, five non-preferred interconnected devices 12 may need to be detected as local to the user device 18 that will be used to control the interconnected devices 12 to increase security and confirmability. In this way, the authentication techniques may be utilized to grant access to and/or to provide the ability to use the support application 20 (e.g., provide the credential to enable use of the virtual buttons in the support application 20) to control the interconnected devices 12 based on a number of the interconnected devices 12 that are communicatively coupled to the user device 18. Additionally or alternatively, the authentication techniques may be utilized to authenticate the user to grant access to any of a variety of accounts (e.g., unrelated to the interconnected devices 12, such as financial accounts/banking accounts or other accounts that are not managed by the support entity or the vendor(s); related to the interconnected devices 12, such as accounts managed by the support entity or the vendor(s)).

More particularly, when the user attempts to use the user device 18 to access an account and/or to control the interconnected devices 12, the user may only be authenticated and granted access to the account and/or to control the interconnected devices 12 if (e.g., in response to; only if) a threshold number of interconnected devices 12 are detected as being in communication with the user device 18 (e.g., being present). Furthermore, the threshold number may vary based on the priority of the interconnected devices 12 that are detected. For example, the user may be authenticated and granted access to the account and/or to control the interconnected devices 12 as long as the first interconnected device is detected. Or in some embodiments, the user may be authenticated and granted access to the account and/or to control the interconnected devices 12 as long as the first interconnected device and at least one of the second interconnected device, the third interconnected device, or the fourth interconnected device is detected. Or in some embodiments, if the first interconnected device is not detected, then the user may be authenticated and granted access to the account and/or to control the interconnected devices 12 only if all of the second interconnected device, the third interconnected device, and the fourth interconnected device are detected. In some embodiments, the priority designations may be numerical values (e.g., on a scale of 1 to 10), and the threshold may be a threshold score. In such cases, the user may only be authenticated and granted access to the account and/or to control the interconnected devices 12 if a sum of the numerical values for the interconnected devices 12 that are detected exceed the threshold score.

It should be appreciated that the profile with the priority designations may be set up automatically, such as by the authenticating computing system 24 or other suitable computing system based on characteristics of the interconnected devices 12 that are detected as being present (e.g., during a set up process) and/or that are input by the user (e.g., during the set up process). For example, the characteristics may include a type of interconnected device, a position of the interconnected device relative to the structure 14, a baseline strength of a communication connection, a security of the interconnected device, or the like.

As noted above, the authentication protocol that authenticates the user based on the detection of the interconnected devices 12 may be used as part of a process (e.g., logon process) to grant the user access to an account (e.g., financial account). For example, the user may be granted access to the account through a financial services application 34 installed on the user device 18 as long as (e.g., only if) the authenticating computing system 24 detects the threshold number of interconnected devices 12. Thus, in response to detecting the threshold number of interconnected devices 12, the authentication computing system 24 may provide a credential to the financial services application 34 (e.g., to open the financial services application 34 and/or to enable use of the financial services application 34 to access the account). In this way, the financial services application 34 may enable use of the financial services application 34 to control the interconnected devices 12 only after the user has been authenticated via the authentication application 22 and the authentication computing system 24.

It should be appreciated that other variations are envisioned. For example, the financial services application 34 may be available and operable to access certain features related to the account (e.g., view account balance) without the credential and to access other features related to the account (e.g., transfer funds) only with the credential. In this way, the financial services application 34 may enable use of the financial services application 34 to access some or all features related to the account only after the user has been authenticated via the authentication application 22 and the authentication computing system 24. Thus, the grant of access to the financial services application 34 may include granting access to the financial services application 34 or certain features thereof.

In some embodiments, the financial services application 34 may not be available (e.g., able to be opened) without the credential from the authentication computing system 24. Additionally or alternatively, the financial services application 34 may be automatically opened (e.g., activated) in response to receipt of the credential from the authentication computing system 24. Additionally or alternatively, certain features within the financial services application 34 (e.g., certain virtual buttons) may be automatically displayed and/or enabled in response to receipt of the credential from the authentication computing system 24. For example, a virtual button to transfer funds may not be visible or may have an inactive appearance (e.g., grayed out and/or presented in dashed lines) while the financial services application 34 is open and prior to receipt of the credential. Then, the virtual button may be displayed to be visible or may have an active appearance (e.g., in color and/or in solid lines) while the financial services application 34 is open and after receipt of the credential.

In some embodiments, the financial services application 34 may provide the user with a first (e.g., simpler) logon process to access the account in response to receipt of the credential or other indication that the authenticating computing system 24 detected the threshold number of interconnected devices 12 (e.g., the user may be prompted to input a user name and password, but may not be prompted to retrieve a passcode sent to a registered email address of the user; fewer steps). Similarly, the financial services application 34 may provide the user with a second (e.g., more complex) logon process to access the account without the credential or in response to receipt of an indication that the authenticating computing system 24 failed to detect the threshold number of interconnected devices 12 (e.g., the user may be prompted to input a user name and password, and may also be prompted to retrieve a passcode sent to a registered email address of the user; more steps). It should be appreciated than any of the authentication steps and protocols disclosed herein may be combined in any suitable manner. Additionally, aspects described with reference to the support application 20 may be implemented with the financial services application 34, and vice versa (e.g., if the support application 20 has a logon process, the logon process may be simpler if the authentication protocol confirms the threshold number of devices and more complex if the authentication protocol does not confirm the threshold number of devices). Furthermore, any suitable computing system may be utilized to carry out the authentication steps and protocols disclosed herein.

Figure 5:
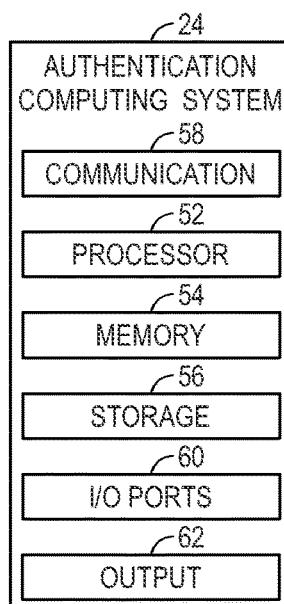
FIG. 5 is a schematic representation of an authentication computing system that may be used in an authentication system, in accordance with an embodiment of the present disclosure.

The authentication computing system 24 and any of the computing systems disclosed herein may include a processor, a memory device, a storage device, and/or a communication component. The memory device and/or the storage device may store code (or instructions), and the processor may function to process the code and control operations in response to the code. It should be noted that the processor may be any type of computer processor or microprocessor capable of executing computer-executable code. Further, the processor may be representative of or include multiple processors. The memory device and the storage device may be any suitable article of manufacture that can serve to store processor-executable code, data, or the like. These articles of manufacture may represent computer-readable media (e.g., any suitable form of memory or storage) that may store the processor-executable code used by the processor to perform the presently disclosed techniques. The memory device and the storage device may also store data, various software applications, and the like. It should be noted that non-transitory merely indicates that the media is tangible and not a signal. The communication component may facilitate network communications (e.g., wired or wireless) with other systems and devices. For example, as shown in FIG. 5, the authentication computing system 24 includes a processor 52, a memory device 54, a storage device 56, and a communication component 58. The authentication computing system 24 may also include an input/output (I/O) port 60 (e.g., to connect to auxiliary devices, such as a keyboard) and an output device 62 (e.g., display, speaker).

While only certain features and embodiments have been illustrated and described, many modifications and changes may occur to those skilled in the art without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An authentication system, comprising:
processing circuitry configured to:
receive an indication of a number of interconnected devices that are in communication with a user device;
compare the number of interconnected devices that are in communication with the user device to a threshold;
enable an application on the user device to control a first portion of the interconnected devices in response to the number of interconnected devices meeting or exceeding the threshold; and
enable the application to control a second portion of the interconnected devices in response to the number of interconnected devices not meeting the threshold, wherein the second portion excludes the first portion.

2. The authentication system of claim 1, wherein the processing circuitry is configured to facilitate a set up process in which the processing circuitry:
receives a list of a plurality of interconnected devices that are likely to be brought into communication with the user device; and
receives a priority designation for each interconnected device of the plurality of interconnected devices.

3. The authentication system of claim 2, wherein the priority designation is based on a reliability of a respective communication connection between each interconnected device and the user device.

4. The authentication system of claim 3, wherein the threshold varies based on the priority designation for each interconnected device that is in communication with the user device.

5. The authentication system of claim 1, wherein the processing circuitry is configured to enable access to an account on the user device in response to the number of interconnected devices meeting or exceeding the threshold.

6. The authentication system of claim 5, wherein the account comprises a financial account.

7. The authentication system of claim 1, wherein enabling the application to control the first portion of the interconnected devices comprises providing a credential to a vendor computing system, wherein the vendor computing system is configured to communicate with at least one of the interconnected devices.

8. The authentication system of claim 7, wherein the processing circuitry is configured to:
receive a control input from a user;
provide the control input to the vendor computing system; and
control the at least one of the interconnected devices via an application programming interface (API) of the vendor computing system.

9. The authentication system of claim 8, wherein the API is configured to provide actuation signals to actuate the at least one of the interconnected devices.

10. An authentication system, comprising:
processing circuitry configured to:
receive a request to authenticate a user via an authentication application installed on a user device;
perform a first authentication step that comprises determining that a number of interconnected devices in communication with the user device exceeds a threshold;
confirm that a support application that is configured to enable the user to control the interconnected devices is installed on the user device; and
in response to completion of the first authentication step and confirmation that the support application is installed on the user device, provide a credential that indicates authentication of the user to the support application to enable control of a first subset of the interconnected devices via the support application, wherein the support application is configured to enable control of a second subset of the interconnected devices via the support application without the completion of the first authentication step, and the second subset excludes the first subset.

11. The authentication system of claim 10, wherein the processing circuitry is configured to:
perform a second authentication step that comprises providing another passcode or another password to a registered email address or a registered phone number; and
in response to completion of the second authentication step, provide the credential that indicates the authentication of the user to the support application.

12. The authentication system of claim 10, wherein the processing circuitry is configured to:
perform a second authentication step that comprises obtaining and verifying a passcode, a password, or biometric data; and
in response to completion of the second authentication step, provide the credential that indicates the authentication of the user to the support application.

13. The authentication system of claim 10, wherein the processing circuitry is configured to:
confirm that a financial services application that is configured to enable the user to access an account is installed on the user device; and
in response to confirmation that the financial services application is installed on the user device, provide the credential that indicates authentication of the user to the financial services application.

14. A method of operating an authentication system, the method comprising:
receiving, at processing circuitry, an indication of a number of interconnected devices that are in communication with a user device;
comparing, with the processing circuitry, the number of interconnected devices that are in communication with the user device to a threshold;
facilitating, with the processing circuitry, control of a first set of the interconnected devices by an application on the user device in response to the number of interconnected devices meeting or exceeding the threshold; and
facilitating, with the processing circuitry, control of a second set of the interconnected devices by the application in response to the number of interconnected devices not meeting the threshold, wherein the second set excludes the first set.

15. The method of claim 14, comprising:
receiving, at the processing circuitry, a list of a plurality of interconnected devices that are likely to be brought into communication with the user device; and
receiving, at the processing circuitry, a priority designation for each interconnected device of the plurality of interconnected devices.

16. The method of claim 15, comprising generating, with the processing circuitry, the priority designation for each interconnected device of the plurality of interconnected devices based on a respective reliability, a respective security, or both for each interconnected device of the plurality of interconnected devices.

17. The method of claim 15, comprising setting, with the processing circuitry, the threshold based on the priority designation for each interconnected device that is in communication with the user device.

18. The method of claim 14, wherein facilitating, with the processing circuitry, control of the first set and the second set of the interconnected devices by the application on the user device comprises automatically opening the application.

19. The method of claim 14, comprising facilitating, with the processing circuitry, access to an account on the user device in response to the number of interconnected devices meeting or exceeding the threshold.

20. The method of claim 14, wherein the application is configured to control at least one of the interconnected devices via an application programming interface (API), wherein the API is configured to provide actuation signals to actuate the at least one of the interconnected devices.

* * * * *